INVENTOR.
Eugene R. Moore
BY
Griswold & Burdick
ATTORNEYS

United States Patent Office 3,492,196
Patented Jan. 27, 1970

3,492,196
BUILT-UP INSULATED STRUCTURE AND
METHOD
Eugene R. Moore, Midland, Mich., assignor to The Dow
Chemical Company, Midland, Mich., a corporation of
Delaware
Filed Oct. 6, 1966, Ser. No. 584,757
Int. Cl. B32b 5/18, 13/04
U.S. Cl. 161—160
11 Claims

ABSTRACT OF THE DISCLOSURE

This invention relates to a method for producing a built-up structure and the structure which is an insulated built-up structure comprising, a supporting structure having an insulated sheet secured thereto, and at least one layer of a coating composition adhered to the insulating sheet, the insulating sheet comprising the foamed copolymer of a vinyl compound and an alpha,beta-monoethylenically unsaturated dicarboxylic acid imide, foamed styrene-maleimide copolymer being preferred.

---

This invention relates to a built-up insulated structure and method of fabrication, the structure containing an insulating sheet or layer made from the foamed imide derivative of a copolymer of a vinyl compound and an $\alpha,\beta$-monoethylenically unsaturated dicarboxylic acid anhydride which foam has improved heat and solvent resistance, dimensional stability, and plaster bond strength. Also, this invention concerns an article made from the foamed imide derivative.

Foamed thermoplastic resins such as foamed polystyrene and a foamed styrene-maleic anhydride copolymer have widespread utility in the fabrication of numerous articles and structures because they possess insulating characteristics. Important limitations in the use of foamed thermoplastic resins can be attributed largely to their poor heat and solvent resistance, dimensional instability when subjected to extreme humidity conditions, and a low with bond strength plaster or mortar.

To further illustrate some of the limitations, in the fabrication of insulated built up roofs, essential elements of the roof structure include a plurality of layers of roofing felt or similar fibrous material bonded together with asphalt or other heat plastifiable or liquifiable bituminous or plastic material, as well as an insulation member integrally incorporated into the roof structure. Frequently, this insulation member consists of a base insulating sheet of foamed plastic which is positioned over a suitable supporting structure. A layer of adhesive material is applied to the upper surface of the foamed insulation and subsequently a plurality of layers of roofing felt are applied. Th layers of felt are bonded together and to the insulation board by an asphalt or thermoplastic composition which is applied in a hot molten condition.

However, much difficulty is encountered in applying conventional adhesives to foamed plastic insulation boards, particularly those made of foamed polystyrene. Conventional roofing asphalts are often heated to a temperature of 300–450° F. which is in excess of the heat distortion temperature of the base insulating sheet. Application of such a hot composition to a thermoplastic insulating board frequently results in severe deformation or distortion. Further, these hot asphalt compositions frequently exhibit a solvelt action on the foamed plastic insulating sheets. Limited success has been obtained by judicious temperature control of the asphalt, but field conditions do not permit sufficiently precise temperature control of the asphalt that acceptable operation can be assured. Sometimes solvents are employed in an attempt to reduce the required temperature, but these frequently have the disadvantage of attacking the base material and requiring an excessive length of time to dry or evaporate from the adhesive. Solvents also represent an undesired and additional expense. Other attempts to overcome the undesirable effects of direct application of hot asphalt to a foamed plastic insulating member include, as described in U.S. Patent 3,094,447, factory application of a first layer of roofing felt to the foamed plastic base sheet which is adhered thereto by asphalt heated to a low temperature and used as an adhesive and thereafter conventionally applying additional layers of felt using the normally heated asphalt. Another method described in U.S. Patent 3,211,597 involves application of a flexible web having on one surface a heat activatable adhesive to a base insulating sheet, the adhesive surface being applied to the insulating sheet. In this manner the web protects the insulating sheet from the hot adhesive. Then, a hot fluid adhesive composition such as hot asphalt is placed on the uncoated side of the web, the adhesive having a sufficient quantity of heat to raise the temperature of the web and the heat activatable adhesive to a sufficient temperature to adhere the heat activatable adhesive to the insulating sheet. Thereafter, a sufficient number of alternating layers of felt and hot asphalt are added to provide a desired thickness of roof. However, both of these methods involve undesirable and additional expense and labor.

It is an object of this invention to provide an insulated built-up structure and a method of fabricating the structure which employs at least one layer of an adhesive composition as a complete or partial outer coating on a base insulating sheet having superior physical properties such as improved dimensional stability to high humidity conditions.

Another object of this invention is to provide an insulated built-up roof and method of fabricating it which employs at least one layer of felt and at least one layer of a hot thermoplastic adhesive composition as an outer coating on a base insulating sheet having improved heat and solvent resistance to the adhesive layer.

Still another object of this invention is to provide a method of fabricating a built-up roof having integral insulating material requiring less pre-installation effort, installation effort, and expense.

A further object of this invention is to provide a method of fabricating an insulated built-up roof which requires neither close control of the temperature of roofing asphalt when applied directly to the foam plastic insulating member, nor special preparation or installation of an overlying base felt or web layer.

An additional object of this invention is to provide a roofing component having superior physical properties.

A still further object of this invention is to provide an insulated built-up wall and a method of fabricating it which employs at least one layer of an adhesive composition as an outer coating on a base insulating sheet having improved bond strength with the adhesive layer.

An additional object of this invention is to provide a wall component having superior physical properties.

Another object of this invention is to provide a foamed article of superior physical properties.

The foregoing and additional objects and cognate advantages and benefits are obtained by providing in an insulated built-up structure a base insulating sheet of improved physical properties comprising the foamed imide derivative of a copolymer of a vinyl compound and an $\alpha,\beta$-monoethylenically unsaturated dicarboxylic acid anhydride, and applying directly to said sheet at least one layer of an adhesive composition.

Further features and advantages of the invention will become more apparent in the following description and specification in connection with the accompanying drawings.

Figure 1:
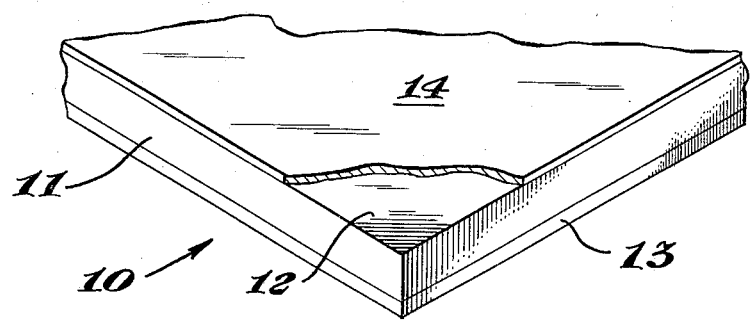
FIG. 1 shows a portion of an insulated built-up structure which constitutes one embodiment of this invention.

Referring in more detail to the drawings:

FIG. 1 shows a portion of an insulated built-up structure 10 comprising a base insulating sheet or layer 11 having a top surface 12. The insulating sheet 11 is adhered to and/or carried by a suitable supporting structure or member 13 such as a masonry, wood, plastic or metal structure. Overlying and adhering to the top surface 12 of the insulating sheet 11 is at least one layer 14 of an adhesive composition such as plaster, mortar, plastic or hot asphalt.

Figure 2:
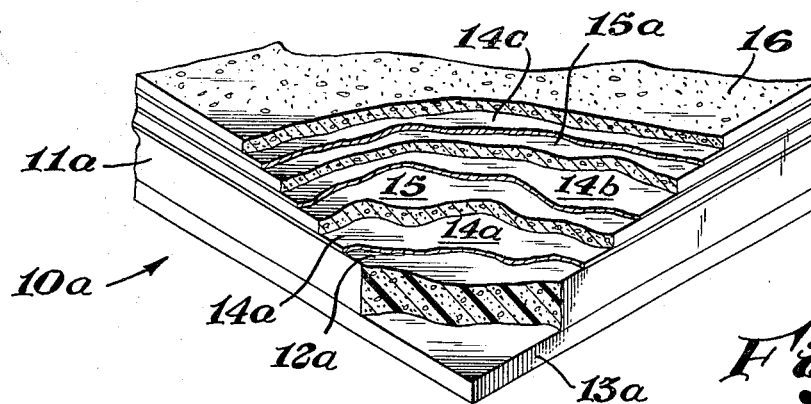
FIG. 2 shows a portion of an insulated built-up roof which constitutes another embodiment of this invention.

FIG. 2 shows a portion of an insulated built-up roof 10a comprising a base insulating sheet or layer 11a having a top surface 12a. The insulating sheet 11a is adhered to and/or carried by a suitable supporting structure or member 13a which may be made of metal, wood, plastic or the like. Over the top surface 12a of the insulating sheet 11a is a layer of a hot fluid adhesive composition 14a such as hot asphalt. Overlying and adhering to the adhesive layer 14a is a layer of roofing felt 15. Above the roofing felt 15 is a second layer of a hot fluid adhesive composition 14b. Overlying and adhering to the second adhesive layer 14b is a second layer of roofing felt 51a. Above the roofing felt 15a is a third adhesive layer 14c in which there is embedded a gravel layer 16.

Figure 3:
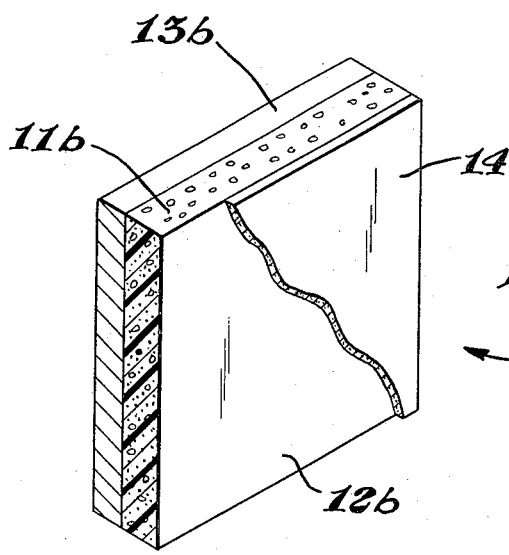
FIG. 3 shows a portion of an insulated built-up wall which constitutes still another embodiment of this invention.

FIG. 3 shows a portion of an insulated built-up wall 10b comprising a base insulating sheet or layer 11b having a top or exposed surface 12b. The insulating sheet 11b is adhered to and/or carried by a suitable supporting structure or member 13b such as masonry, metal, plastic or wood. Overlying and adhering to the top or exposed surface 12b of the insulating sheet 11b is at least one layer of an adhesive composition 14d such as plaster, mortar or a plastic.

In the practice of the invention, the base insulating sheets, 11, 11a, and 11b, in each of the figures above will comprise the foamed imide derivative of a copolymer of a vinyl compound and an $\alpha,\beta$-monoethylenically unsaturated dicarboxylic acid anhydride.

According to my invention, a foamed thermoplastic resin to be employed as the base insulating sheet or substrate and having improved resistance to solvents and high temperature, as well as improved dimensional stability and plaster or mortar bond strength can be prepared by a method which comprises treating a copolymer of a vinyl compound and an $\alpha,\beta$-monoethylenically unsaturated dicarboxylic acid anhydride with ammonia or a primary amine, or mixture thereof, to produce the half-amide. The polymer is then converted to the imide by heating, during which water is evolved. A vacuum or partial vacuum will speed this reaction but is not necessary. This step can also be carried out by extrusion foaming the treated copolymer to produce the foamed imide derivative.

Copolymers of styrene and maleic anhydride are particularly suitable in preparing a foamed imide derivative for use as a base insulating sheet according to the invention. Copolymers containing from 4 to 32 mole percent and preferably from 8 to 20 mole percent maleic anhydride have great utility as thermoplastic molding resins, the upper value being limited by increased water sensitivity and loss of thermoplasticity, the lower value being limited by the amount of maleic anhydride necessary to give a significant increase in the solvent resistance and the heat distortion properties of the final foamed product. Most advantageously, the copolymers are homogeneous, or essentially homogeneous. By homogeneous it is meant that the polymer molecules have a substantially uniform ratio of styrene to maleic anhydride or other comonomers as disclosed herein.

In addition to the styrene-maleic anhydride copolymer, copolymers of other vinyl compounds and $\alpha,\beta$-monoethylenically unsaturated dicarboxylic acid anhydrides may be used in preparing the foamed thermoplastic copolymer imide derivative employed in the practice of the invention. Suitable vinyl compounds include acrylonitrile, vinyl acetate, alkyl acrylates containing from 1 to 8 carbon atoms in the alkyl group, alkyl methacrylates containing from 1 to 4 carbon atoms in the alkyl group, halogenated styrenes, alkylated styrenes, ethylene, propylene, butadiene, isoprene, vinyl chloride and vinylidene chloride. Additionally, the copolymer may be produced from a mixture containing two or more of these vinyl compounds. Among acid anhydrides which may be used in addition to maleic anhydride are chloromaleic, itaconic and citraconic anhydride.

In preparing the imide derivative of the copolymer heretofore described according to the invention, ammonia or a short chain primary amine or mixtures thereof may be used. Suitable primary amines include methylamine, ethylamine, hexylamine, n-heptyl amine and the like.

According to my invention, the imide derivative is prepared by reacting ammonia or a primary amine or mixtures thereof with the copolymer of a vinyl compound and an $\alpha,\beta$-monoethylenically unsaturated dicarboxylic acid anhydride to produce the half-amide derivative which can then be foamed as by extrusion foaming to produce the desired foamed imide derivative.

The reaction to form half-amide derivative should be carried out until about one mole of ammonia or a primary amine or a mixture thereof has been absorbed per mole of acid anhydride.

The reaction to form the imide derivative can be carried out at reaction temperatures between about 160° C. and about 270° C., depending upon the anhydride level in the copolymer.

In an alternative procedure to prepare a foamed imide for use in practicing my invention, a vinyl compound can be copolymerized with the imide derivative of an acid anhydride of the type herein described.

The following non-limiting examples serve to illustrate my invention.

EXAMPLE I

About 100 pounds of an 85 mole percent styrene-15 mole percent maleic anhydride copolymer was placed in a heavy wall polyethylene bag. The bag was purged with ammonia periodically and allowed to set at room temperature until infrared analysis indicated the complete disappearance of anhydride groups in the copolymer. The resulting polymer was entirely converted to the half-amide form, with considerable salt formation (with the second carboxyl group) and considerable dissolved ammonia.

This treated polymer was melted at a temperature of 500° F. and pressurized in a two and one-half inch extruder with 10.8 parts by weight of blowing agent comprising 75 percent methyl chloride and 25 percent Freon 11 being pumped in per 100 parts of polymer. The polymer-blowing agent mixture was then cooled to 225° F. in a mixer-cooler after which it was extruded and allowed to foam freely, forming a continuous foamed section approximately two inches by three inches in cross-section. Infrared analysis indicated essentially complete conversion to the imide derivative, i.e., styrene-maleimide copolymer foam.

For purposes of comparison a sample of polystyrene was extrusion foamed in a similar manner. The percent water absorption of the two foamed samples was determined according to ASTM CX272. The heat distortion temperature was determined, using foam which had been cured for 48 hours at 140° F. Test specimens measuring 1 inch x 1 inch x 6 inches were placed, one at a time, in an oven at a preset temperature. After one hour, the specimen undergoing test was removed and examined for any visible distortion or shrinkage. The procedure was repeated with the oven temperature 5° F. higher if there was no distortion or shrinkage, or 5° F lower if there was distortion or shrinkage. The heat distortion was recorded as the highest temperature at which the foam was subjected without any observable distortion or shrinkage.

|  | Foamed Polystyrene | Styrene-Maleimide Copolymer Foam |
|---|---|---|
| Water absorption, percent | 0.13 | 1.00 |
| Density, pounds/cu. ft. | 1.99 | 2.3 |
| Heat distortion temp., °F | 170 | 270 |

The foamed styrene-maleimide copolymer had improved dimensional stability because of its higher heat distortion temperature and excellent humid aging characteristics (after 24 hours at 80° C. and 100 percent relative humidity there was no measurable change in dimension).

EXAMPLE II

For the purpose of comparing foamed polystyrene and foamed styrene-maleimide copolymer for use as base insulating sheets in an insulated built-up roof structure, the following test was made. Because conventional roofing asphalts are often heated to temperatures between 300 and 450° F. prior to application, a "hot asphalt" test was conducted wherein one-fourth inch of asphalt at about 450° F. was poured directly on the foam samples which are at about 80° F. Foamed polystyrene failed almost instantaneously due to the high heat and solvent action of the asphalt. However, when the hot asphalt was poured on the foamed styrene-maleimide copolymer there were no significant deleterious effects such as distortion, deformation or dissolution of the foam, due to the higher heat and solvent resistance of the foamed imide derivative.

Thus, the foamed imide derivative provides a roofing component having superior physical properties. An insulated built-up roof can be fabricated with the use of this foam without an impractically close control of the temperature of the roofing asphalt when it is applied directly to the foam insulating sheet, and without precoating the foamed thermoplastic insulating sheet with a base layer of roofing felt using asphalt heated to a low temperature as an adhesive, and without using a web having one surface coated with a heat activatable adhesive, for application directly over the foam insulating sheet before the hot asphalt and roofing felt can be applied.

Typically, an insulated built-up roof can be fabricated by applying over a roof deck or other suitable supporting structure a base insulating sheet made from the foamed imide derivative herein described, applying a layer of hot molten asphalt directly to the upper surface of the foamed insulation, and subsequently applying at least one layer of roofing felt bonded together and to the insulation sheet by an asphalt adhesive composition which is applied in a hot molten condition. Alternating layers of roofing felt and asphalt are added to provide the desired thickness of roof, the topmost asphalt layer frequently having a gravel layer embedded therein.

EXAMPLE III

The following data demonstrate the improved plaster or mortar bond strength exhibited by the styrene-maleimide (SMI) copolymer foam as compared with polystyrene foam and polyurethane foam.

Bond strength tests were conducted with test specimens of the foam measuring five and one-fourth inches square and at least one inch thick. An aluminum ring having an outside diameter of three inches and a tapered inner surface with the inside diameter being two and three-eighths inches at the top and two inches at the bottom was placed on the center of the specimen test surface. The tapered inside surface of the ring was first coated with grease taking care not to allow the grease to contact the foam surface to be bonded. The ring was then filled with a mortar of one of the following recipes:

(A)

| | | |
|---|---|---|
| Gypsum plaster | grams | 500 |
| Sand (ASTM C-190) | do | 1250 |
| Water | ml | 350 |

(B)

| | | |
|---|---|---|
| Portland cement (ASTM C-150) | grams | 350 |
| Sand (ASTM C-190) | do | 1050 |
| Lime (ASTM C-206-49, Type S) | do | 87.6 |
| Water | ml | 250 |

The mortar in the ring was tamped and then covered with a damp cloth to prevent rapid drying and was allowed to set for 12 days at room temperature before testing. A pull ring was inserted in a groove cut on the outside of the test ring. With the foam test specimen placed in a holding jig, a one-sixteenth inch steel cable was attached to the pull ring and to a tensile testing machine having a 200 pound load cell. The machine was started and the load required to break the mortar bond or the foam specimen, whichever occurred first, was measured. For each foam sample the average break load for six separate specimens was recorded. Bond strength in lb./sq. inch (p.s.i.) was calculated as follows:

$$\text{Bond strength (psi)} = \frac{\text{average break load in pounds}}{3.1416}$$

The bonding surface in each test case was a fresh surface exposed with a rotating disc-type meat slicer.

The SMI foam was derived from an 85 mole percent styrene-15 mole percent maleic anhydride copolymer in a manner similar to Example I.

| Sample | Density, lbs./ft.³ | Cell Size, mm. | Plaster Bond Strength of foams (p.s.i.) | |
|---|---|---|---|---|
| | | | Gypsum Plaster | Portland Plaster |
| SMI foam | 2.08 | 0.45 | 10.1 | 12.8 |
| Do | 3.00 | 1.20 | 9.8 | 18.6 |
| Polystyrene foam | 2.15 | 0.50 | 6.0 | 6.7 |
| Do | 2.07 | 0.90 | 5.6 | 6.7 |
| Polyurethane | 2.00 | 0.40 | 4.2 | 4.8 |

Thus, it is seen that the bond strength with SMI foams is one and one-half to four times that with polystyrene and polyurethane foams.

This improvement in bond strength is very important for building applications where it is desirable to plaster directly over the foam to produce a strong composite or built-up wall having good insulation properties. In this application, it is desirable to cement or secure the foam to a masonry or wood structure or other suitable supporting structure using a solvent-type asphalt-based adhesive prior to applying the plaster to the foam. Whereas foamed polystyrene is rapidly attacked by the solvent in such a system, the SMI foam exhibits great resistance to these solvents in addition to the greatly improved bond strength. Likewise, if it is desired to apply a solvent-based paint as a coating over the foam insulating sheet, the SMI foam will offer great solvent resistance while foamed polystyrene would be rapidly attacked by the solvent.

EXAMPLE IV

About 200 pounds of the styrene-maleic anhydride copolymer of Example I was treated with ammonia in a manner similar to Example I. This treated polymer was then extruded at a rate of 25 pounds per hour in a two inch twin screw extruder having a volatile port at which a vacuum was drawn. The extrusion temperature was 480° F.

Neutron Activation analysis of the extruded product indicated 2.5 percent nitrogen and 5.1 percent oxygen, or essentially complete conversion to the imide.

Beneficial results similar to those of Example I were obtained when this extruded imide product was foamed in a manner similar to that of Example I.

I claim.

1. An insulated built-up structure comprising, a supporting structure having an insulating sheet secured thereto, and at least one layer of a coating composition adhered to the insulating sheet,
   the insulating sheet comprising the foamed copolymer of a vinyl compound and an $\alpha,\beta$-monoethylenically unsaturated dicarboxylic acid imide.

2. The structure of claim 1, wherein the copolymer is the imide derivative of a copolymer of styrene and maleic anhydride.

3. An insulated built-up structure according to claim 1 wherein the supporting structure is a roof deck, and
   the insulating sheet is coated with one or more layers of roofing felt, the insulating sheet and roofing felt being bonded together by a hot thermoplastic adhesive composition.

4. The structure of claim 3, wherein the adhesive composition is a hot, molten asphalt.

5. An insulated built-up structure according to claim 1, wherein the supporting structure is a wall.

6. The structure of claim 5, wherein the coating composition is a plaster or mortar.

7. A method of fabricating an insulated built-up structure which comprises:
   applying an insulating sheet to a supporting structure, the sheet comprising the foamed copolymer of a vinyl compound and an $\alpha,\beta$-monoethylenically unsaturated dicarboxylic acid imide, and
   adhering at least one layer of a coating composition to the exposed surface of the insulating sheet.

8. A method of fabricating an insulated built-up structure according to claim 7 wherein the supporting structure is a roof deck, and
   the insulating sheet is coated with one or more layers of roofing felt, the insulating sheet and roofing felt being bonded together by a hot thermoplastic adhesive composition.

9. The method of claim 8 wherein the adhesive composition is hot molten asphalt.

10. A method of fabricating an insulated built-up structure according to claim 7 wherein the supporting structure is a wall.

11. The method of claim 10, wherein the coating composition is a plaster or mortar.

References Cited

UNITED STATES PATENTS

| | | | |
|---|---|---|---|
| 3,094,447 | 6/1963 | Chamberlain | 156—71 |
| 3,211,597 | 10/1965 | Sheahan | 156—71 |
| 3,249,561 | 5/1966 | Hendrix | 161—161 |
| 3,345,246 | 10/1967 | Sheahan | 161—161 |

ROBERT F. BURNETT, Primary Examiner

W. J. VAN BALEN, Assistant Examiner

U.S. Cl. X.R.

260—2.5; 161—161, 236; 156—71; 52—309